United States Patent [19]

Yoon

[11] Patent Number: 4,603,037

[45] Date of Patent: * Jul. 29, 1986

[54] DESULFURIZATION OF FLUE GAS FROM MULTIPLE BOILERS

[75] Inventor: Heeyoung Yoon, McMurray, Pa.

[73] Assignee: Conoco Inc., Wilmington, Del.

[ * ] Notice: The portion of the term of this patent subsequent to Jul. 15, 2003 has been disclaimed.

[21] Appl. No.: 714,751

[22] Filed: Mar. 22, 1985

[51] Int. Cl.$^4$ .......................... C01B 17/00; B01J 8/00
[52] U.S. Cl. ..................... 423/244; 423/242; 423/243; 110/343; 110/345
[58] Field of Search .......... 423/242 A, 244 A, 242 R, 423/244 R, 243; 110/343, 345

[56] References Cited

U.S. PATENT DOCUMENTS

| | | | |
|---|---|---|---|
| 3,411,864 | 11/1968 | Pallinger | 423/242 |
| 3,520,649 | 7/1970 | Tomany et al. | 423/242 |
| 3,632,306 | 1/1972 | Villiers-Fisher | 423/242 |
| 4,309,393 | 1/1982 | Nguyen | 423/244 |
| 4,397,742 | 8/1983 | Minnick | 423/244 |
| 4,454,102 | 6/1984 | Lindau et al. | 423/244 |
| 4,533,532 | 8/1985 | Gebhard et al. | 423/244 |

*Primary Examiner*—Gregory A. Heller
*Attorney, Agent, or Firm*—William A. Mikesell; C. R. Schupbach

[57] ABSTRACT

Flue gases from two or more boilers are treated for reduction of their sulfur dioxide content by injecting as sorbent fine limestone or dolomite into one of the boilers, recovering a mixture of spent and calcined sorbent from the resulting flue gas, hydrating the resulting mixture to provide a dry slaked sorbent, and adding the dry slaked sorbent to sulfur-containing flue gas from a second boiler at a temperature of about 120° to 230° C.

2 Claims, 1 Drawing Figure

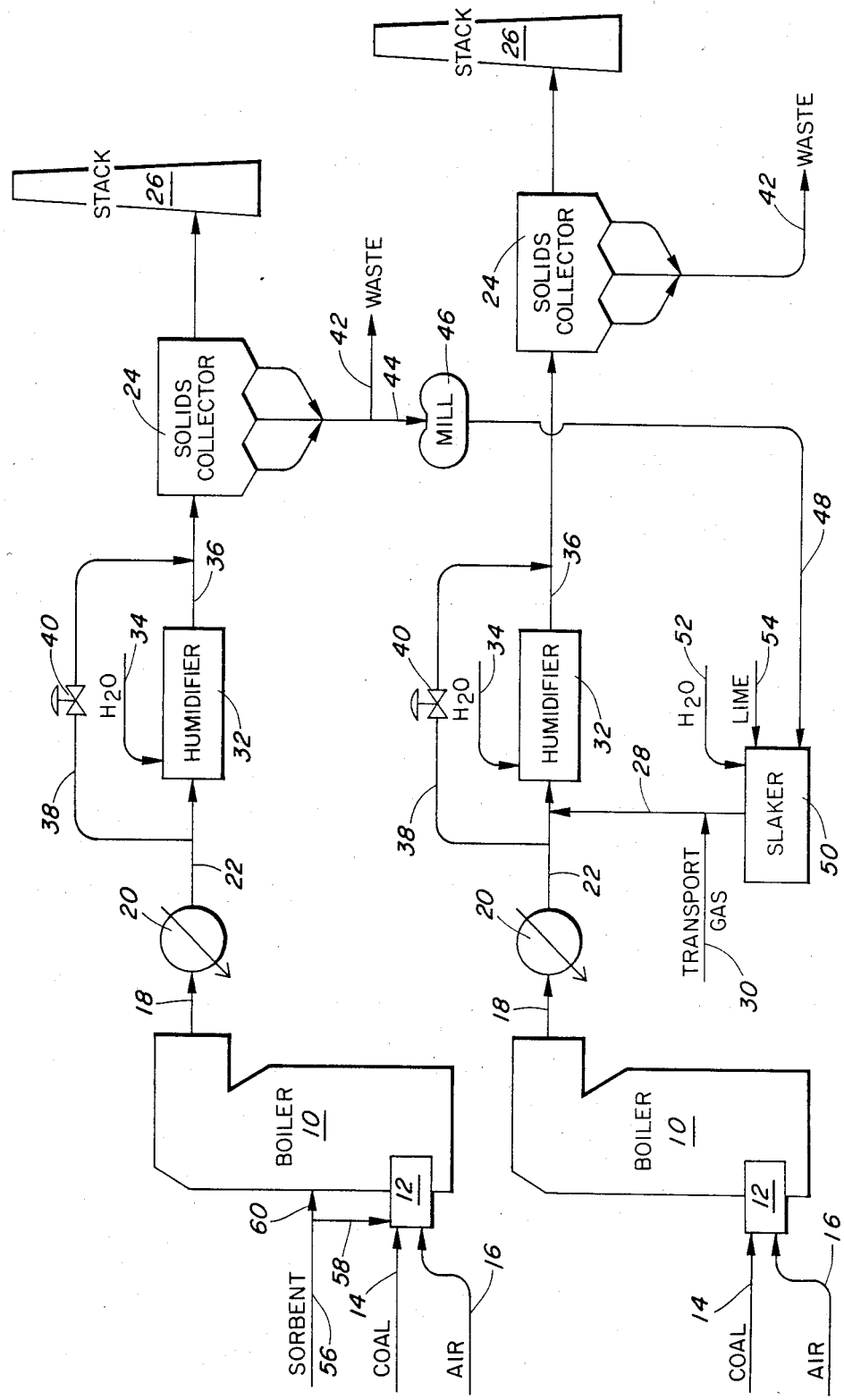

DESULFURIZATION OF FLUE GAS FROM MULTIPLE BOILERS

FIELD OF THE INVENTION

This invention relates to reduction of sulfur dioxide content in flue gases from two or more boilers having differing combustion zone temperature profile or flue gas ductwork characteristics. In one aspect, the invention relates to a method for applying flue gas desulfurization to an existing boiler installation whereby an inexpensive form of sorbent is utilized sequentially to treat two different sources of flue gas effectively.

BACKGROUND OF THE INVENTION

Efforts to reduce sulfur emissions in the gaseous products from combustion of a sulfur-containing fuel have been made in varying directions. Some processes attempt to reduce or eliminate the sulfur in the fuel prior to its combustion. Other processes propose the addition of compounds to the combustion zone which will in some manner change the nature of the sulfur compounds such that they may be more readily removed from the combustion products. And yet other processes remove sulfur compounds from the gaseous combustion products by chemical reaction.

U.S. Pat. No. 4,185,080, issued Jan. 22, 1980 to Rechmeier discloses a combustion gas desulfurization process wherein a powdered sorbent such as limestone or dolomite is added to a combustion zone, and a portion of the solids collected from the flue gas is reactivated and can be returned for injection into or downstream of the combustion zone. An earlier U.S. Pat. No. 3,320,906 to Domahidy, issued May 23, 1967, teaches mixing limestone with the coal being fed to a boiler, with the flue gas then being passed to a wet scrubber for additional capture of sulfur compounds by the calcined limestone.

The approach of chemical treatment to effect flue gas desulfurization can be further subdivided into wet scrubbing wherein a solution or suspension of reagent both enters and leaves the flue gas contacting zone in liquid state, spray drying wherein a solution or suspension of reagent enters the flue gas contacting zone in liquid state but is dried to produce a powdered solid leaving the contacting zone, and dry treatment wherein the treating reagent is a solid state powder both entering and leaving the contacting zone.

Illustrative of the wet scrubber approach is U.S. Pat. No. 3,928,537, issued Dec. 23, 1975 to Saitoh et al, which discloses contacting the exhaust gas with an aqueous solution of an organic acid to form a soluble sulfite or sulfate. The sulfite or sulfate is removed, and the organic acid regenerated, by a second step comprising reaction with a calcium compound such as an inorganic or an organic acid salt, for example calcium hydroxide or calcium formate.

The spray dryer approach is illustrated for example by U.S. Pat. No. 4,279,873, issued July 21, 1981 to Felsvang et al, which discloses spraying a suspension of fresh slaked lime and recycled fly ash plus spent calcium compound into the hot flue gas in such a manner as to evaporate the slurry droplets to dryness; the resulting powdered solids are removed from the flue gas by a downstream electrostatic precipitator or bag filter.

U.S. Pat. No. 4,178,349, issued Dec. 11, 1979 to Wienert illustrates the dry treatment; it discloses mixing a dry, powdered lime-bearing material in a reactor, and subsequently separating the solids from the treated flue gas. Another patent, U.S. Pat. No. 4,442,079, issued Apr. 10, 1984, to Donelly et al, outlines a flue gas desulfurization process which is primarily adapted to the spray dryer procedure just discussed, but is also stated to be applicable to injection of dry sorbent at a point of relatively low flue gas temperature, with water being sprayed into the gas either upstream or downstream of the sorbent injection point.

Another "mixed" (wet and dry) flue gas desulfurization process is described in U.S. Pat. No. 4,388,281, issued June 14, 1983 to Hölter et al. In this patent, dry sorbent can be mixed with the coal prior to combustion, but the main feature resides in splitting the flue gas into two parallel streams, with one stream being treated with fresh dry sorbent, and the other being wet scrubbed with sorbent solution containing e.g. piperazine.

Current thinking seems to be that no one of the above-discussed strategies is the unique answer to the sulfur emission problem, either for new installations or for retrofit on an existing installation. Rather, numerous site-specific factors such as proximity to reagent source, space availability, and extent of sulfur removal required, must enter into the selection at each plant.

SUMMARY OF THE INVENTION

It is an objective of the present invention to provide a novel and advantageous method of removing sulfur compounds, especially sulfur dioxide, from combustion exhaust gas.

According to the present invention, flue gas from a first combustion zone is desulfurized by first contacting it in such combustion zone with a finely divided dry sorbent, and then recovering and reactivating the resulting gaseous suspension of calcined solids for admixture into the flue gas from a second combustion zone.

BRIEF DESCRIPTION OF THE DRAWING

In the drawing,

The sole FIGURE represents a flow diagram, partially schematic, of a flue gas desulfurization process according to this invention.

DETAILED DESCRIPTION OF THE INVENTION

Flue gas containing sulfur dioxide from combustion of a sulfur-containing fuel is typically passed from the combustion chamber through heat recovery exchangers and thence by way of duct work to a stack for disposal. Where the fuel is a solid, such as coal, or a heavy liquid, the combustion product gases will also contain ash solids such as fly ash, in which instance the flue gas will first be treated for solids removal by such as a bag filter or electrostatic precipitator (ESP) prior to being passed to the stack. In many existing installations such as power plants, two or more boilers are provided in parallel trains. In some such installations, the parallel trains are essentially independent, whereas in others, some of the downstream equipment such as duct work, ESP or bag house, and stack, are shared. Further, it is quite usual in such multiple installations that the boilers in the parallel trains differ from each other.

The invention will now be described by referring to the drawing. It is to be understood that the two parallel trains illustrated will often differ significantly from each other, but that numerals common to the two trains represent equipment having similar function. A combustor such as boiler 10 is provided with a burner 12 which is adapted to introduce a pulverized solid fuel such as coal from conduit 14 and a combustion-supporting gas such as air from conduit 16. Hot combustion products leave the upper region of boiler 10, travelling past and through various heat exchange surfaces which typically extract heat by radiant and convective transfer, until they are discharged from the boiler assembly at duct 18. The final stage of heat recovery from the flue gas is often an air preheater, shown here as 20, which serves to preheat combustion air to conduit 16. Past practice has been that flue gas leaving air preheater 20 by way of duct 22 is passed directly to solids removal to separate out fly ash, such as by a bag filter or electrostatic precipitator 24, and thence discharged by a stack 26.

According to this invention, the hot flue gas in duct 22 of one of the parallel trains (the lower train in the drawing) is treated for capture of its sulfur dioxide and sulfur trioxide content by injection of a finely divided dry sorbent powder such as calcium hydroxide, magnesium hydroxide, or mixtures of these two, by way of a conduit 28. The dry powder can be carried through conduit 28 by use of a transport gas such as air or superheated steam from conduit 30. A short distance downstream from conduit 28, duct 22 enters humidifier 32, wherein water or steam from conduit 34 is sprayed into the flue gas. Humidified flue gas passes by way of duct 36 to solids collector 24 and thence to stack 26. A portion of the flue gas in duct 22 can bypass both the sorbent powder addition of conduit 28 and humidifier 32 by way of by-pass duct 38 and its associated damper 40, as will be more fully discussed.

In the other parallel train (the upper train in the drawing), the sorbent is added in its less expensive but less reactive carbonate form, as limestone or dolomite, at conduit 56. This material can either be added to boiler 10 by way of conduit 58 into burner 12, or by way of conduit 60 through separate injection ports into an upper region of the combustion zone, depending upon the prevailing temperature profile and residence time. In either event, the limestone or dolomite is calcined by the elevated temperature. The resulting suspension of calcium and/or magnesium oxide is thus afforded additional reaction time for flue gas desulfurization in duct 18 and air preheater 20.

Solids removed in collector 24 will normally comprise a mixture of fly ash, spent sorbent, and a proportion of unreacted sorbent. According to the invention, the mixture of solids in conduit 44 is treated to regenerate its unreacted sorbent content. This material can be subjected to grinding as by mill 46, although such is usually not required, and is then passed by way of conduit 48 to slaker 50. The unreacted sorbent portion of the solids in conduit 48 is in the form of calcium and/or magnesium oxide, and this material is reacted in slaker 50 with at least the stoichiometric amount, and preferably up to about 50 percent excess, of water or preferably steam from conduit 52 to produce a dry slaked hydroxide product. As described earlier, this portion of solids containing dry slaked sorbent becomes the material injected by way of conduit 28 into duct 22. Sorbent values, both spent and unspent, are continuously discarded from the system by way of conduit 42. Additional make-up can be added in the form of the oxide, e.g. quicklime, to slaker 50 by way of conduit 54. The humidification of the flue gas and its entrained sorbent powder by spraying water containing solubilizing agent by way of conduits 34, and the use of such solubilizing agent in the slaking water introduced by way of conduit 52, are optional adjuvants to this invention. As solubilizing agent is presently preferred sodium hydroxide, although other useful materials include sodium carbonate, calcium chloride, adipic acid, and glycerol. Although I do not wish to be so bound, I theorize that compounds which form highly ionized solutions or which are deliquescent serve to form a thin liquid film of greatly increased reactivity toward sulfur dioxide on the surface of each of the particles of gas-suspended solid sorbent.

The desulfurization efficiency achieved by limestone injection into a boiler (upper train in the drawing) depends strongly on the boiler temperature profiles to which limestone particles are exposed. The optimum temperature range is about 850°–1250° C. At flue gas temperatures over 1250° C., thermodynamics favor the decomposition of calcium sulfate, the product from the desulfurization reaction. At temperatures under 850° C., the slow kinetics of desulfurization (calcium sulfate formation) limits sulfur removal. Because of these critical temperature effects, boiler temperature profiles must be used in selecting the boilers retrofitted with the limestone injection desulfurization. Some boilers may be modified using multistage burners to provide more suitable boiler-temperature profiles for this desulfurization process.

The 'coolside' desulfurization using slaked LI fly ashes as sorbent (lower train in the drawing) uses the duct work downstream of the air preheater and the particulate collector as the space for the desulfurization reaction. As mentioned above in order to promote the desulfurization reaction of $Ca(OH)_2$ in the slaked LI fly ashes, an aqueous solution of additives can be injected into the duct work. The water in the aqueous solution increases the humidity of the flue gas. A relative humidity as high as 60% (about 10° C. dew point approach) is desired for effective coolside desulfurization. A portion of the required humidity may be provided with a steam injection. The temperature of the humidified flue gas at the point where it enters solids collector 24 is advantageously between about 10 and about 40, preferably between about 10° and about 25° C., above its dew point, and can be controlled by adjusting by-pass damper 40. The temperature of the flue gas at the point of injection of the dry sorbent via conduit 28 ('coolside') should be between about 120° and about 230°, and preferably between about 140° and about 175° C.

The invention will now be illustrated by the following example.

EXAMPLE

Two boilers at a coal-fired electric utility station are selected for modification according to this invention. One of the boilers has a relatively low severity temperature profile, and so is fitted with nozzles which inject powdered limestone into the combustion space above its upper row of burners. Solids from the ESP servicing this boiler are slaked to form a dry powder containing about 50 weight percent slaked lime. This powder is injected into the flue gas duct of the second boiler at a point downstream of its air preheater at a point where the gas temperature is about 150° C., and water is injected into the duct immediately downstream of the powder injection point, in amount sufficient to result in a gas temperature, at the inlet of the ESP servicing this boiler, about 10° C. above its dew point. Flue gas from both ESPs is ducted to a common stack. When a coal of about 3 weight percent sulfur is burned, the stack gas analyzes about 2100 ppmv (dry) $SO_2$ without addition of the limestone and slaked BLI ash, and is reduced to about 730 ppm SO₂ by sorbent addition according to this invention.

Reasonable variation and modification are possible within the scope of the foregoing disclosure and the appended claims to this invention, the essence of which is that there is provided an improved method for reducing the sulfur dioxide content of flue gas by reaction with sorbent of increased activity, and for preparing such sorbent.

What is claimed is:

1. The method for reducing sulfur dioxide content of flue gas resulting from combustion of sulfur-containing fuel in a plurality of combustion zones, which method comprises:
   (a) injecting into a first of said combustion zones a finely divided sorbent comprising calcium carbonate;
   (b) recovering from said first combustion zone a first flue gas having suspended therein particles of spent sorbent and particles of calcined sorbent;
   (c) separating from said first flue gas a mixture of particles comprising said spent sorbent and said calcined sorbent;
   (d) reacting a portion of said mixture with water to provide a finely divided dry slaked sorbent;
   (e) combusting a portion of said sulfur-containing fuel in a second combustion zone to produce a second flue gas containing sulfur dioxide;
   (f) mixing into said second flue gas at a point where its temperature is between about 120° and about 230° C. slaked sorbent from step (d) to produce a suspension of slaked sorbent in flue gas wherein water is added to said suspension of slaked sorbent in flue gas of step (f) in amount sufficient to reduce the temperature of said suspension to between about 10° and about 30° C. above its dew point wherein said water comprises an aqueous solution of at least one solubilizing agent selected from the group consisting of sodium hydroxide, sodium carbonate, calcium chloride, adipic acid and glycerol;
   (g) separating solids from said suspension of slaked sorbent in flue gas; and
   (h) collecting from said separating of steps (c) and (g) flue gases of reduced sulfur dioxide content.

2. The method of claim 1 further comprising similarly adding water to said first flue gas of step (b).

* * * * *